United States Patent
Skeoch et al.

(10) Patent No.: US 7,434,104 B1
(45) Date of Patent: Oct. 7, 2008

(54) METHOD AND SYSTEM FOR EFFICIENTLY TESTING CORE FUNCTIONALITY OF CLUSTERED CONFIGURATIONS

(75) Inventors: Ronald Leaton Skeoch, Lake Forest, CA (US); Sherrie Le Houang, El Monte, CA (US); Matthew Ky Phuong, Rosemead, CA (US); Jay Hyon Kang, Chino, CA (US)

(73) Assignee: Unisys Corporation, Blue Bell, PA (US)

( * ) Notice: Subject to any disclaimer, the term of this patent is extended or adjusted under 35 U.S.C. 154(b) by 564 days.

(21) Appl. No.: 11/094,918

(22) Filed: Mar. 31, 2005

(51) Int. Cl.
*G06F 11/00* (2006.01)

(52) U.S. Cl. .............. 714/38; 714/4; 709/224

(58) Field of Classification Search ........... 714/4; 709/224
See application file for complete search history.

(56) References Cited

U.S. PATENT DOCUMENTS

| | | | |
|---|---|---|---|
| 6,446,218 B1* | 9/2002 | D'Souza | 714/4 |
| 7,020,797 B2* | 3/2006 | Patil | 714/4 |
| 7,120,821 B1* | 10/2006 | Skinner et al. | 714/4 |
| 7,139,929 B2* | 11/2006 | Ghosh et al. | 714/4 |
| 2003/0051188 A1* | 3/2003 | Patil | 714/4 |
| 2004/0260809 A1* | 12/2004 | Yodaiken | 709/224 |
| 2005/0060599 A1* | 3/2005 | Inami et al. | 714/4 |
| 2005/0198272 A1* | 9/2005 | Bernard et al. | 709/224 |
| 2005/0198552 A1* | 9/2005 | Baba et al. | 714/4 |
| 2006/0195715 A1* | 8/2006 | Herington | 714/4 |

OTHER PUBLICATIONS

Server stress test, Microsoft paper, Jan. 1999.*
Microsoft Corporation, WHQL Test Specification, Feb. 15, 2001, Chapter 24, 14 pages.

* cited by examiner

*Primary Examiner*—Scott T. Baderman
*Assistant Examiner*—Kamini Patel
(74) *Attorney, Agent, or Firm*—Phuong-Quan Hoang; Robert P. Marley

(57) ABSTRACT

An embodiment of the present invention is a technique for testing core functionality of a clustered system having a plurality of nodes. A cluster population test that includes populating the clustered system with cluster-aware applications is performed. A crash reboot test is performed to stress core operations running within the clustered system; the crash reboot test includes executing a series of crashes or reboots on a subset of the nodes. A move test that includes moving resources to a selected node of the clustered system and verifying that the resources remain on-line at the selected node is performed. A stop test that includes stopping cluster service on a selected subset of nodes of the clustered system and restarting the cluster service on the selected subset of nodes is performed. A Blue Screen Of Death (BSOD) test that includes crashing in BSOD mode one of the nodes of the clustered system and testing reservation release on the crashed node is performed.

21 Claims, 8 Drawing Sheets

METHOD AND SYSTEM FOR EFFICIENTLY TESTING CORE FUNCTIONALITY OF CLUSTERED CONFIGURATIONS

BACKGROUND

1. Field of the Invention

Embodiments of the invention are in the field of techniques for testing clustered configurations, and more specifically, relate to a technique for efficiently testing and validating core functionality of a clustered configuration before submitting the clustered configuration to a more rigorous and time-consuming Hardware Compatibility Test (HCT) suite for certification purpose.

2. Description of Related Art

A cluster is a group of computers that work together to run a common set of applications and appear as a single system to the client and applications. The computers are physically connected by cables and programmatically connected by cluster software. These connections allow the computers to use failover and load balancing, which is not possible with a stand-alone computer.

Clustering, provided by cluster software such as Microsoft Cluster Server (MSCS) of Microsoft Corporation, provides high availability for mission-critical applications such as databases, messaging systems, and file and print services. High availability means that the cluster is designed so as to avoid a single point-of-failure. Applications can be distributed over more than one computer (also called node), achieving a degree of parallelism and failure recovery, and providing more availability. Multiple nodes in a cluster remain in constant communication. If one of the nodes in a cluster becomes unavailable as a result of failure of hardware or software, or of an administrator action for maintenance, another node takes over the workload of the failing node and begins providing service. This process is known as failover. With very high availability, users who were accessing the service would be able to continue to access the service, and would be unaware that the service was briefly interrupted and is now provided by a different node. A failback occurs when a previously failed application is restored to a running status on its original node.

Clustered configurations offered by a vendor are tested to obtain certifications. For clustered configurations running on a Windows operating system platform, the certifying authority is Microsoft Corporation.

The process of certification requires the set-up of the hardware components in a specific clustered configuration and the successful passing of a set of tests called the Cluster Hardware Compatibility Test (HCT) specifically provided by Microsoft Corporation. In addition to a specific hardware configuration, a clustered configuration may also include specific component drivers. Evidence of the successful passing of the Cluster HCT is submitted in the form of test log results to Microsoft Corporation. After accepting the test log results, Microsoft Corporation authorizes listing of the tested clustered configuration as a Certified Clustered Configuration in the Hardware Compatibility List on a Microsoft web site.

The Hardware Compatibility Test (HCT) is a suite of tests developed by Microsoft's Windows Hardware Quality Labs. HCT is used to test computer systems and peripherals for compatibility with the Windows operating system. There are portions of the HCT that specifically target the hardware and software that make up the clustered configuration. These portions are called Cluster HCT. A typical clustered configuration would comprise two or more systems, a shared disk subsystem, and a network switch/hub. The Cluster HCT is used to verify that these components work well together under the Windows operating system.

The effort and time required in conducting Cluster HCT are considerable. Dedicated hardware resources, setup, effort and labor of staff that must have an extremely high level of expertise in clustering technologies are required.

Thus, it is desirable to have a technique that can be used to provide comprehensive validation of clustered configurations in addition to providing a screening technique to identify obstacles that would show up in the lengthy Cluster HCT certification testing and provide aid in the debugging and replication of such obstacles before subjecting the clustered configurations to the actual Clustering HCT tests. It is also desirable that such technique is automated so as to greatly reduce the human effort and level of expertise required in testing cluster systems.

SUMMARY OF THE INVENTION

An embodiment of the present invention is a technique for testing core functionality of a clustered system having a plurality of nodes. A cluster population test that includes populating the clustered system with cluster-aware applications is performed. A crash reboot test is performed to stress core operations running within the clustered system; the crash reboot test includes executing a series of crashes or reboots on a subset of the nodes. A move test that includes moving resources to a selected node of the clustered system and verifying that the resources remain on-line at the selected node is performed. A stop test that includes stopping cluster service on a selected subset of nodes of the clustered system and restarting the cluster service on the selected subset of nodes is performed. A Blue Screen Of Death (BSOD) test that includes crashing in BSOD mode one of the nodes of the clustered system and testing reservation release on the crashed node is performed.

BRIEF DESCRIPTION OF THE DRAWINGS

The invention may be best understood by referring to the following description and accompanying drawings that are used to illustrate embodiments of the invention. In the drawings.

DESCRIPTION

An embodiment of the present invention is a technique for testing core functionality of a clustered system having a plurality of nodes. A cluster population test that includes populating the clustered system with cluster-aware applications is performed. A crash reboot test is performed to stress core operations running within the clustered system; the crash reboot test includes executing a series of crashes or reboots on a subset of the nodes. A move test that includes moving resources to a selected node of the clustered system and verifying that the resources remain on-line at the selected node is performed. A stop test that includes stopping cluster service on a selected subset of nodes of the clustered system and restarting the cluster service on the selected subset of nodes is performed. A Blue Screen Of Death (BSOD) test that includes crashing in BSOD mode one of the nodes of the clustered system and testing reservation release on the crashed node is performed.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
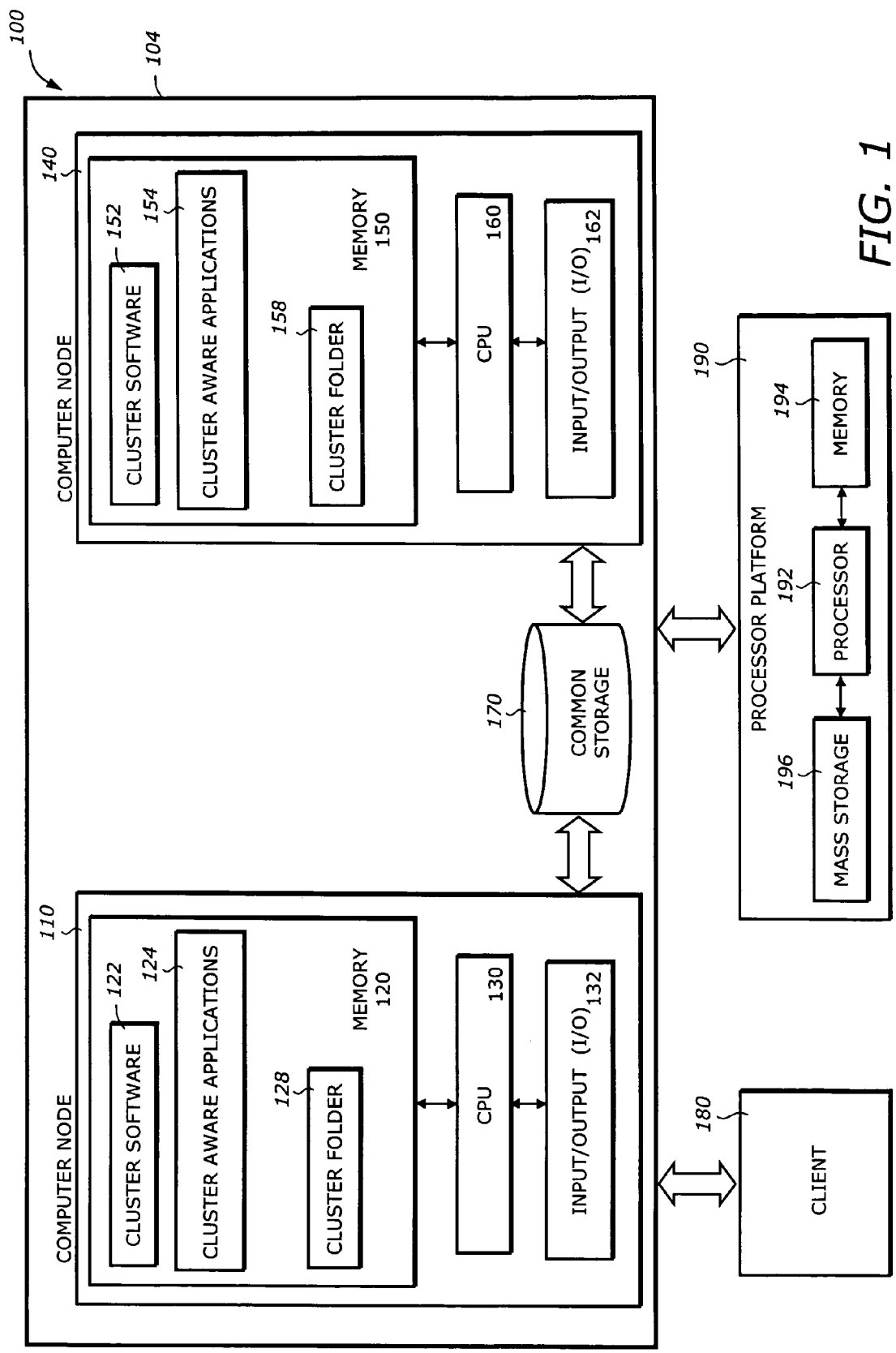
FIG. 1 is a diagram illustrating an example system 100 in which one embodiment of the invention can be practiced.

FIG. 1 is a diagram illustrating an example system 100 in which one embodiment of the invention can be practiced. The system 100 includes a server system 104 interfacing with a client 180 and a processor platform 190.

The client 180 communicates with the server system via a communication network. The client can access an application running on the server system using the virtual Internet Protocol (IP) address of the application.

The server system 104 includes a cluster 106. The cluster 106 includes a node 110, a node 160, and a common storage 170.

Each of the nodes 110, 140 is a computer system. Node 110 comprises a memory 120, a processor unit 130 and an input/output unit 132. Similarly, node 140 comprises a memory 150, a processor unit 160 and an input/output unit 162. Each processor unit may include several elements such as data queue, arithmetic logical unit, memory read register, memory write register, etc.

Cluster software such as the Microsoft Cluster Service (MSCS) provides clustering services for a cluster. In order for the system 106 to operate as a cluster, identical copies of the cluster software must be running on each of the nodes 110, 140. Copy 122 of the cluster software resides in the memory 120 of node 110. Copy 152 of the cluster software resides in the memory 150 of node 140.

A cluster folder containing cluster-level information is included in the memory of each of the nodes of the cluster. Cluster-level information includes DLL files of the applications that are running in the cluster. Cluster folder 128 is included in the memory 120 of node 110. Cluster folder 158 is included in the memory 150 of node 140.

A group of cluster-aware applications 126 is stored in the memory 120 of node 110. Identical copies 156 of these applications are stored in the memory 150 of node 140.

When a cluster-aware application is run on a node, the cluster-aware application also comprises cluster resources. The cluster resources are logical objects created by the cluster at cluster-level. The cluster resources include a common storage resource identifying the common storage 170, an application IP address resource identifying the IP address of the cluster-aware application, and a network name resource identifying the network name of the cluster-aware application.

The DLL files for the resource type of the cluster aware application include the cluster resource dynamic link library (DLL) file and the cluster administrator extension DLL file. These DLL files are stored in the cluster folder 128 in node 110 (FIG. 1).

Computer nodes 110 and 140 access a common storage 170. The common storage 170 contains information that is shared by the nodes in the cluster. This information includes data of the applications running in the cluster. Typically, the common storage 170 includes a number of virtual disks or Logical Unit Numbers (LUN). In a cluster using MSCS, only one computer node can access a specific LUN on the common storage at a time.

It is noted that, in other cluster configurations, using different type of cluster software and different type of operating system for the computer nodes in the cluster, a common storage may not be needed. In such a cluster with no common storage, data for the clustered applications are stored with the clustered applications, and are copied and updated for each of the nodes in the cluster.

The processor platform 190 is a computer system that interfaces with the cluster 104. It includes a processor 192, a memory 194, and a mass storage device 196. The processor platform 190 may communicate with the server system via a private hub or via the same communication network used by client 180. The processor platform 190 can access an application running on the server system using the virtual Internet Protocol (IP) address of the application.

The processor 192 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The memory 194 stores system code and data. The memory 194 is typically implemented with dynamic random access memory (DRAM) or static random access memory (SRAM). The system memory may include program code or code segments implementing one embodiment of the invention. The memory 194 includes a cluster test program of the present invention when loaded from mass storage 196. The cluster test program may also simulate the testing functions described herein. The cluster test program contains instructions that, when executed by the processor 192, cause the processor to perform the tasks or operations as described herein.

The mass storage device 196 stores archive information such as code, programs, files, data, databases, applications, and operating systems. The mass storage device 196 may include compact disk (CD) ROM, a digital video/versatile disc (DVD), floppy drive, and hard drive, and any other magnetic or optic storage devices such as tape drive, tape library, redundant arrays of inexpensive disks (RAIDs), etc. The mass storage device 196 provides a mechanism to read machine-accessible media. The machine-accessible media may contain computer readable program code to perform tasks as described herein.

There are four main phases in the Cluster HCT:

(1) Hardware phase. This phase is designed to stress the hardware of the cluster configuration to verify its ability to support the cluster software. In this phase, the cluster software is not installed on the nodes of the cluster. This phase tests the ability to change and maintain ownership of shared disks. The shared storage bus may be a SCSI bus or a Fibre Channel Fabric or Arbitrated Loop. This phase stresses the shared storage bus by issuing SCSI commands to the SCSI bus or to the SCSI protocol on the Fibre Channel.

(2) Validate 1 node phase. This phase of testing is to ensure that all of the cluster resources will work with only a single node. This test phase verifies that the cluster will function correctly with only one node online.

(3) Validate N node phase. This phase of testing is to ensure that all of the cluster operations between nodes such as move, failover, etc. will work. This phase tests how the cluster will handle failing conditions in a normal environment. Cluster HCT will issue commands to move clustered resources from one node to another. Nodes will be crashed at timed intervals to see how well the cluster responds.

(4) Move N node phase. This phase is similar to the Validate N node phase except that nodes are not crashed in this phase.

Each phase is 24 or 48 hours long. If a cluster passes all these phases and Microsoft Corporation accepts the corresponding submitted logs of test results and other supporting material, the cluster will be considered compatible and certified for use with Windows operating systems.

If a cluster system has hardware, software, driver, or firmware components that deviate or fails to perform per defined specification of Cluster HCT, corrective action must be undertaken to correct the components that failed. In many cases, iterations of these corrective actions are required. This greatly burdens the dedicated hardware resources and staff of required technical expertise. The cost in terms of material and labor is increased with each test and debug iteration.

In terms of time, a complete HCT certification can require from 5 days of testing for a simplest configuration to as many as 21 days for a most complex configuration. Assuming no error or failure occurs during the time certification testing is underway, the testing typically requires one test engineer, competent in clustering technology, and machine resources.

The tests of the present invention are much less complex and time-consuming than the Cluster HCT, yet can test efficiently the core functionality of a cluster configuration. The tests of the present invention will identify weaknesses, faults, and isolate problems in the clustered configuration that must be fixed before subjecting the clustered configuration to Cluster HCT testing. Once the clustered configuration has passed the tests of the present invention, it can be subjected to the Cluster HCT testing with a much higher probability of success.

One embodiment of the present invention is a cluster test program. In one implementation, the cluster test program receives user input via an application user interface. A user may specify, from a list of available tests shown in the main menu of the application user interface, a particular test to be performed, for a single server or for a cluster, and the duration of the test. If the specified test is for a cluster, the user is asked to provide the cluster name so that the cluster test program can search for the nodes of the cluster that has that cluster name. Running status of the specified test is displayed to user. The test may be launched from the processor platform 190 shown in FIG. 1.

The cluster test program can configure and set up the following tests: (1) Cluster population test; (2) Crash reboot test; (3) Move/stop test; (4) Blue Screen of Death (BSOD) Test, to test the core functionality of a clustered system.

In addition, the cluster test program may also include the following stress tests: Network Stress Test; Disk Stress Test; Memory Stress Test; and Processor stress test. Since the stress tests do not address the core functionality of a clustered system, the stress tests are optional with respect to the goal of pre-testing a clustered system before submitting it to an actual Cluster HCT. These optional stress tests help identify other problems that a clustered system might encounter during a Cluster HCT run or in a real customer environment.

All of the tests in the cluster test program are independent of each other and can be run in any order.

Figure 2:
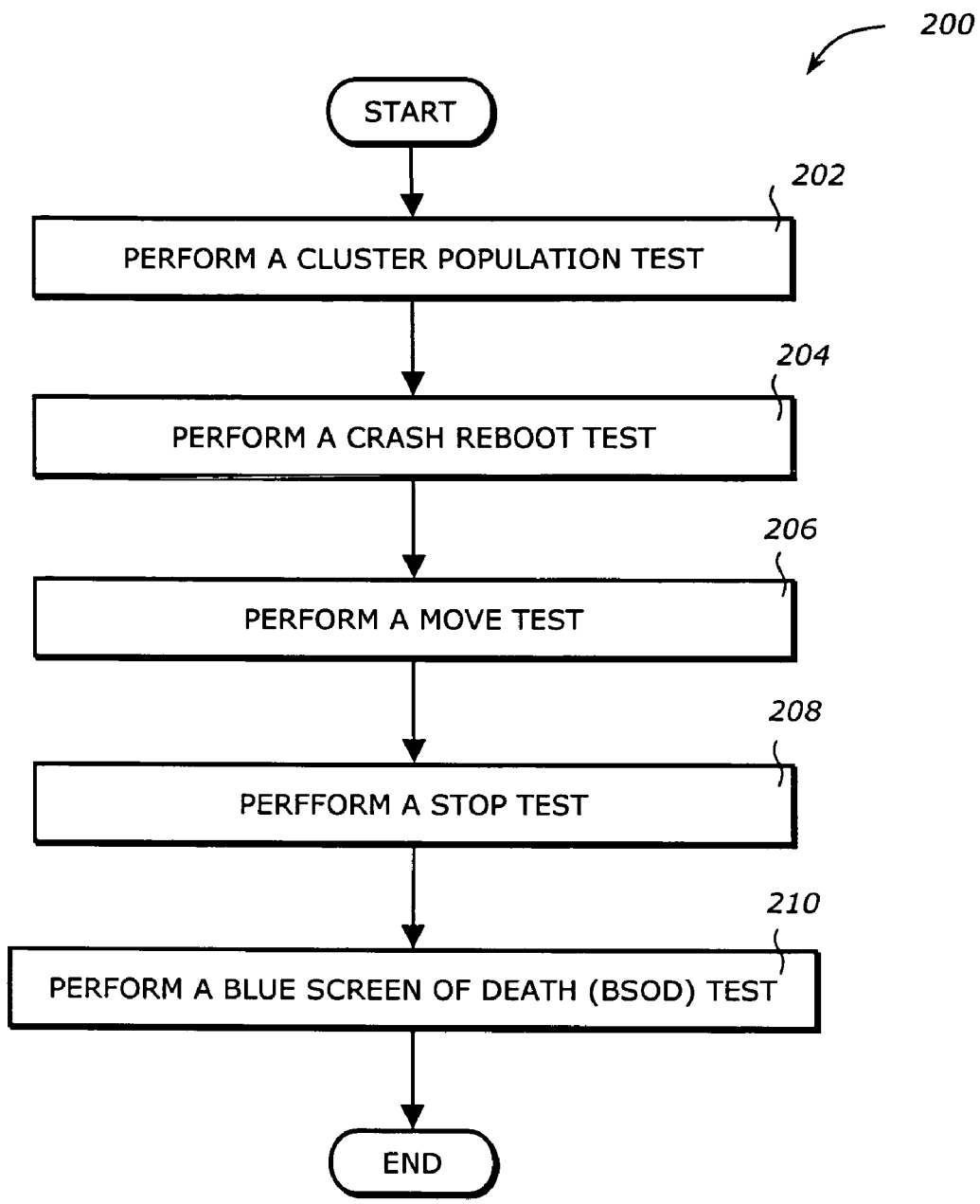
FIG. 2 is a flowchart illustrating an embodiment 200 of the present invention.

FIG. 2 is a flowchart illustrating an embodiment 200 of the present invention. Upon Start, process 200 performs a cluster population test that includes populating the clustered system with cluster-aware applications (block 202). Process 200 performs a crash and reboot test to stress core operations running within the clustered system (block 204). This crash and reboot test includes executing a series of crashes or reboots on a subset of the nodes in the clustered system. Process 200 performs a move test that includes moving resources to a selected node of the clustered system and verifying that the resources remain on-line at the selected node (block 206). Process 200 performs a stop test that includes stopping cluster service on a selected subset of nodes of the clustered system and restarting the cluster service on the selected subset of nodes (block 208). Process 200 performs a Blue Screen Of Death (BSOD) test that includes crashing, in BSOD mode, one of the nodes of the clustered system and testing reservation release on the crashed node (block 210). Process 200 then terminates.

Cluster Population Test

Figure 3:
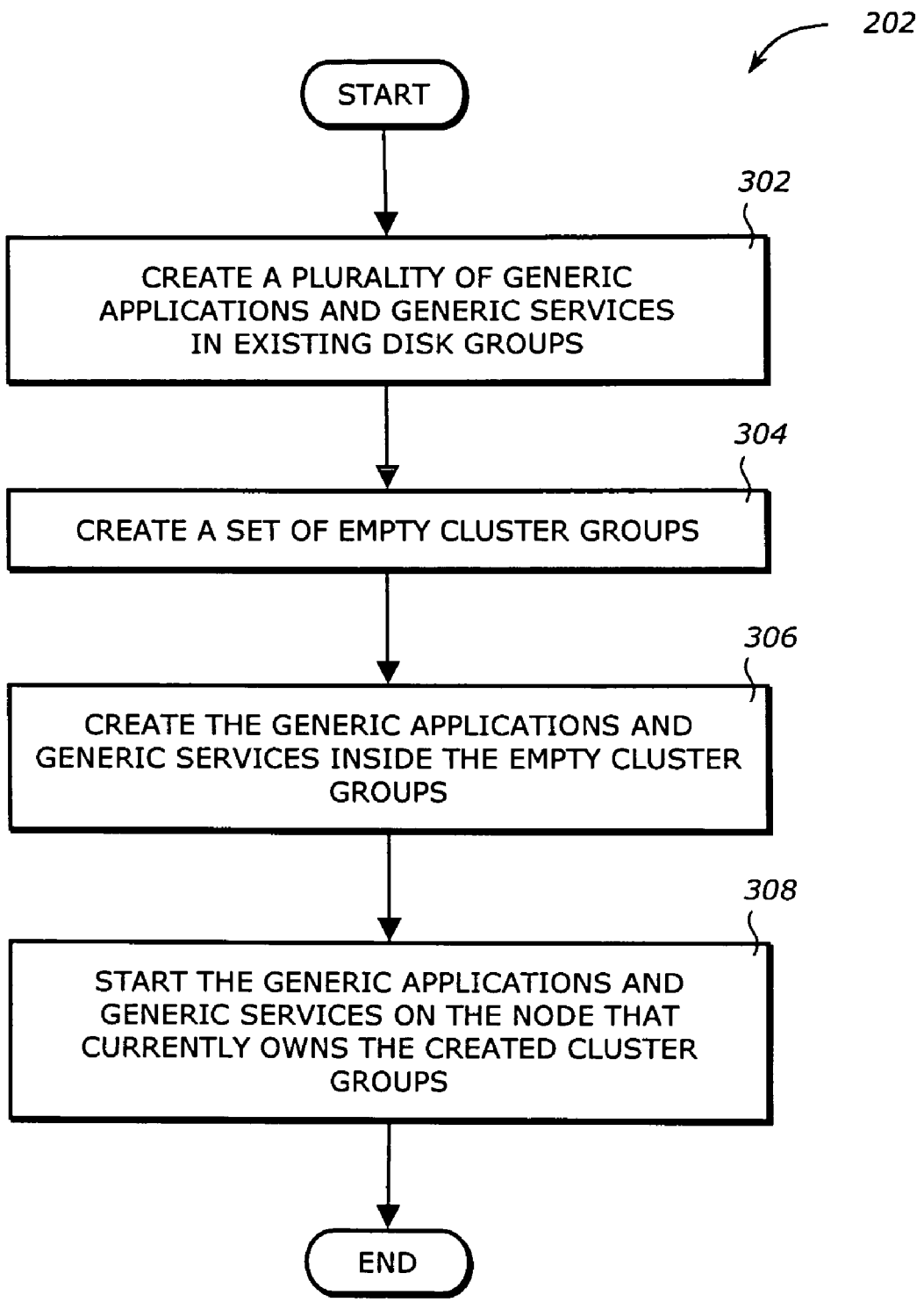
FIG. 3 is a flowchart illustrating an embodiment of block 202 of process 200 shown in FIG. 2.

FIG. 3 is a flowchart illustrating an embodiment of block 202 of process 200 shown in FIG. 2. Upon Start, process 202 creates a plurality of generic applications and generic services in existing disk groups in the clustered system that do not include the quorum shared disk (block 302). Process 202 creates a set of empty cluster groups (block 304). Then, process 202 creates the generic applications and generic services inside the empty cluster groups (block 306). Next, process 202 starts the generic applications and generic services on the node that currently owns the newly created cluster groups (block 308). Process 202 then terminates.

The cluster population test is designed to test that a cluster configuration can be populated with cluster-aware applications. This is particularly useful for verifying part of the core functionality that will be tested in the Validate N-Node Phase of the Cluster HCT.

One of the most important aspects of a successful recovery of failed resources is agreement among all the nodes in a cluster about which node will own the shared disk and where resources will migrate in the failed state. In order to achieve such agreement among all the nodes in a cluster, the cluster software defines a quorum resource, which all nodes in a cluster must have access to, but only one node can own the quorum resource at a given time. Through the cluster software, the cluster hardware enforces the restriction that only one node at a time can own the quorum resource.

In the current release of MSCS, the only defined quorum resource type is a shared physical disk that supports hardware-based lockout (thus the requirement for at least one shared SCSI disk). Other shared disks can store data, but the quorum shared disk is dedicated to its role in cluster management. In addition to serving as the quorum resource, the quorum shared disk stores the cluster change log and database. When the node that owns the quorum shared disk fails, the subsequent quorum owner can finish any cluster-related transactions that are outstanding at the time of the failure after reading them from the log on the quorum shared disk.

A cluster includes a quorum shared disk resource and a number of other disk resources. The cluster population test will generate a variety of generic applications and services in a mixture of existing and newly created cluster groups.

The processor stress service will be registered as a generic service. The disk stress application and memory stress application will be registered as generic applications.

These "dummy" resources provide additional strain on the cluster when moving cluster groups from one node to another.

The cluster population test tests the basic minimal functionality of a clustered configuration in an automated manner. If the clustered configuration fails this test, this indicates a problem at a fundamental level; additional tests of the clustered configuration should not be undertaken until the root cause of this failure is understood.

The cluster population test generates, installs, and configures, in automated fashion, generic cluster aware applications, cluster generic services, and cluster groups.

In one embodiment of the invention, the cluster population test comprises the following operations. First, a cluster name specified by a user is received via a user interface, the cluster name corresponding to a cluster to be populated. Next, a set of generic applications and generic services is created in existing disk groups that do not include the quorum disk group. Next, four empty cluster groups are created. Next, a set of generic applications and generic services is created inside the empty cluster groups. Finally, the generic applications and generic services are started on the node that owns these newly created cluster groups. A log file is generated to show the process of the command execution. The command stops once the resources have been created. A cleanup command argument is available to remove the created resources from the cluster.

Crash Reboot Test

Figure 4:
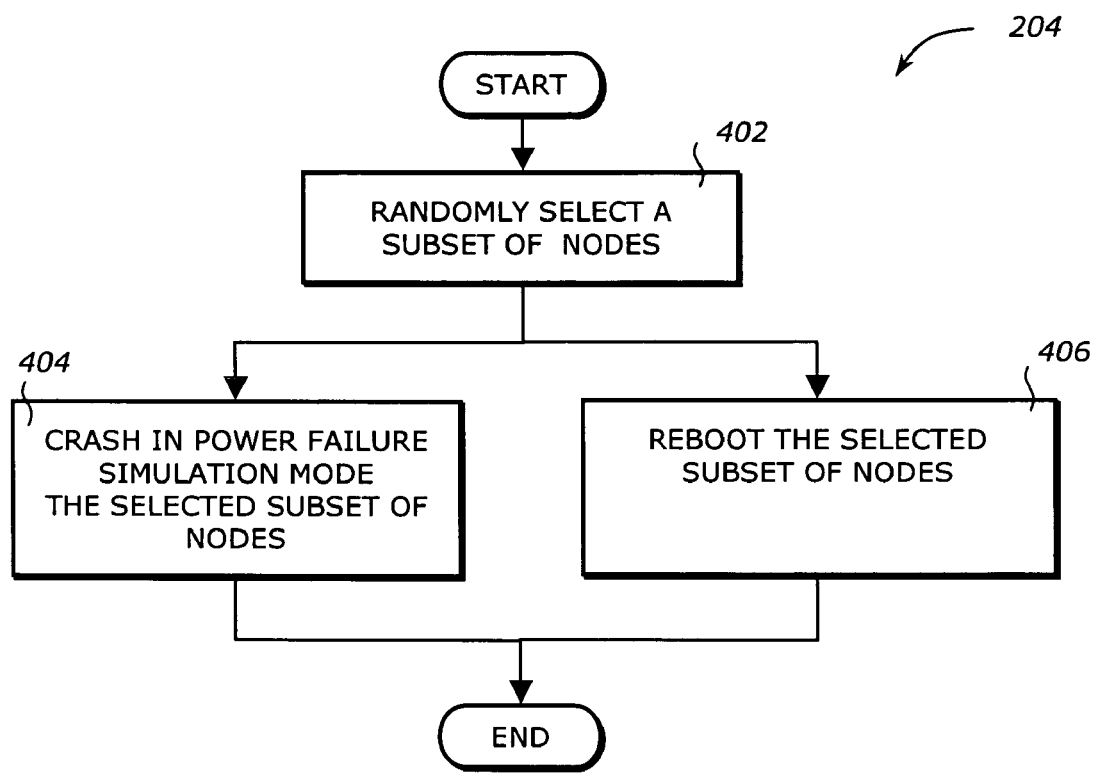
FIG. 4 is a flowchart illustrating an embodiment of block 204 of process 200 shown in FIG. 2.

FIG. 4 is a flowchart illustrating an embodiment of block 204 of process 200 shown in FIG. 2. Upon Start, process 204 randomly selects nodes forming a subset of nodes (block 402). Process 204 then performs one of the following: (1) crashes the selected subset of nodes in power failure simulation mode, so that cluster resources on the selected subset of nodes are failed over to one or more nodes that are not included in the selected subset of nodes (block 404), or (2) reboots the selected subset of nodes, so that cluster resources on the selected subset of nodes are failed over to one or more nodes that are not included in the selected subset of nodes (block 406). Process 204 then terminates.

A user may select the Crash Reboot test for either a single server or a cluster environment. The Crash Reboot test allows the user to stress most of the core operations of a cluster that are processed in the event of a node failure. When running for a single non-clustered server, this test will issue a pattern of crashes and reboots consecutively. In one implementation, the pattern is set and does not change.

Historically, crash or reboot has been one of the most common failure modes preventing Cluster Certification. Ensuring that a cluster system is capable of passing this Crash Reboot test alone eliminates one of the most common reasons for system failures in the Validate N Node phase of the HCT certification test run.

The Crash Reboot test may be run on a single non-clustered server. Test failure results from the single non-clustered server configuration are directly correlated to failures in a clustered configuration. This is an example where test results from running a test on a non-clustered configuration allow a user to find test applications that will cause failures in the actual Cluster HCT.

For a clustered configuration, the Crash Reboot test may provide a level of stress (associated with crashes or reboots) higher than the one provided by the Cluster HCT. When a cluster has a functionality problem associated with crashes or reboots during a Cluster HCT run, the problem usually occurs intermittently and may require multiple runs of about forty hours each to replicate. An important element of any problem debugging is the ability to replicate the problem to study the system state. The Crash Reboot test provides a user with the ability to replicate the problem in much shorter time.

In one implementation, for each iteration of the Crash Reboot test, the Crash Reboot test randomly selects the total number of nodes to crash or to reboot, randomly selects the nodes for the selected total number, and randomly selects to crash or to reboot. The total number of nodes is up to N−1 nodes in a cluster having a total of N nodes. The Crash Reboot test repeats the iteration described above for the duration of the Crash Reboot test. The test duration is specified by a user. The repetitive crashing or rebooting will heavily stress the cluster as cluster resources are forced to move to other remaining node or nodes. In the Crash Reboot test, a crash is a crash in the power failure simulation mode, while a reboot is a graceful reboot of the operating system.

The Crash Reboot test enables the user to validate a system's ability to correctly perform a series of consecutive crashes and reboots in various states of operation and recovery.

In one embodiment, the Crash Reboot test can be performed in IA-64 and IA-32 hardware environments and in Microsoft Windows environments. The Crash Reboot test may be launched from the processor platform 190 (FIG. 1, also called client master) using the user interface. The duration of the test may be specified by a user. The running status of the test is displayed to the user. A status log of the test is created.

Move and Stop Tests

Figure 5:
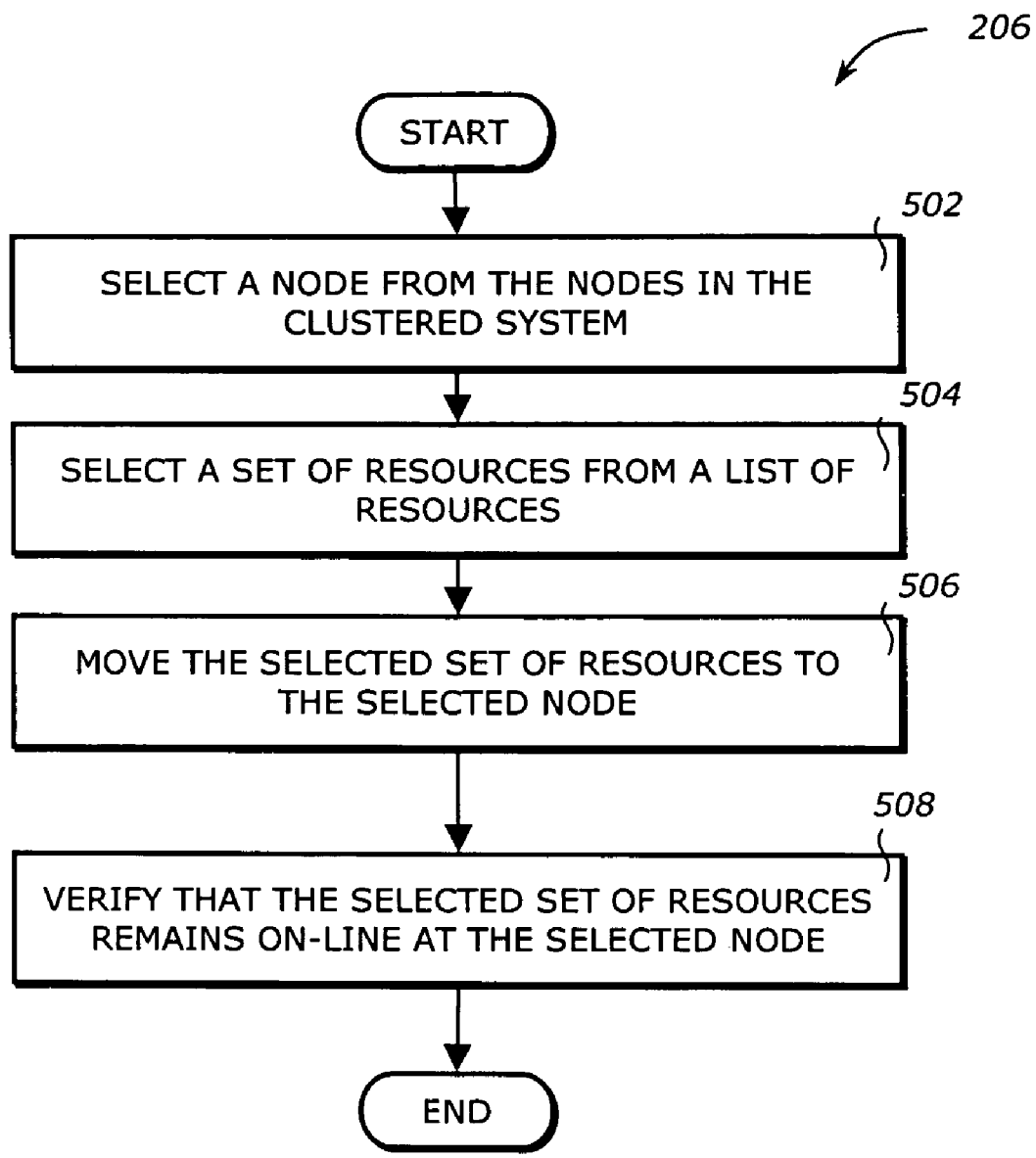
FIG. 5 is a flowchart illustrating an embodiment of block 206 of process 200 shown in FIG. 2.

FIG. 5 is a flowchart illustrating an embodiment of block 206 of process 200 shown in FIG. 2. Upon Start, process 206 selects a node from the nodes in the clustered system (block 502). Process 206 selects a set of resources from a list of available resources (block 504). Then process 206 moves the selected set of resources to the selected node (block 506). Process 206 verifies that the selected set of resources remains on-line at the selected node (block 508). Process 206 then terminates.

Figure 6:
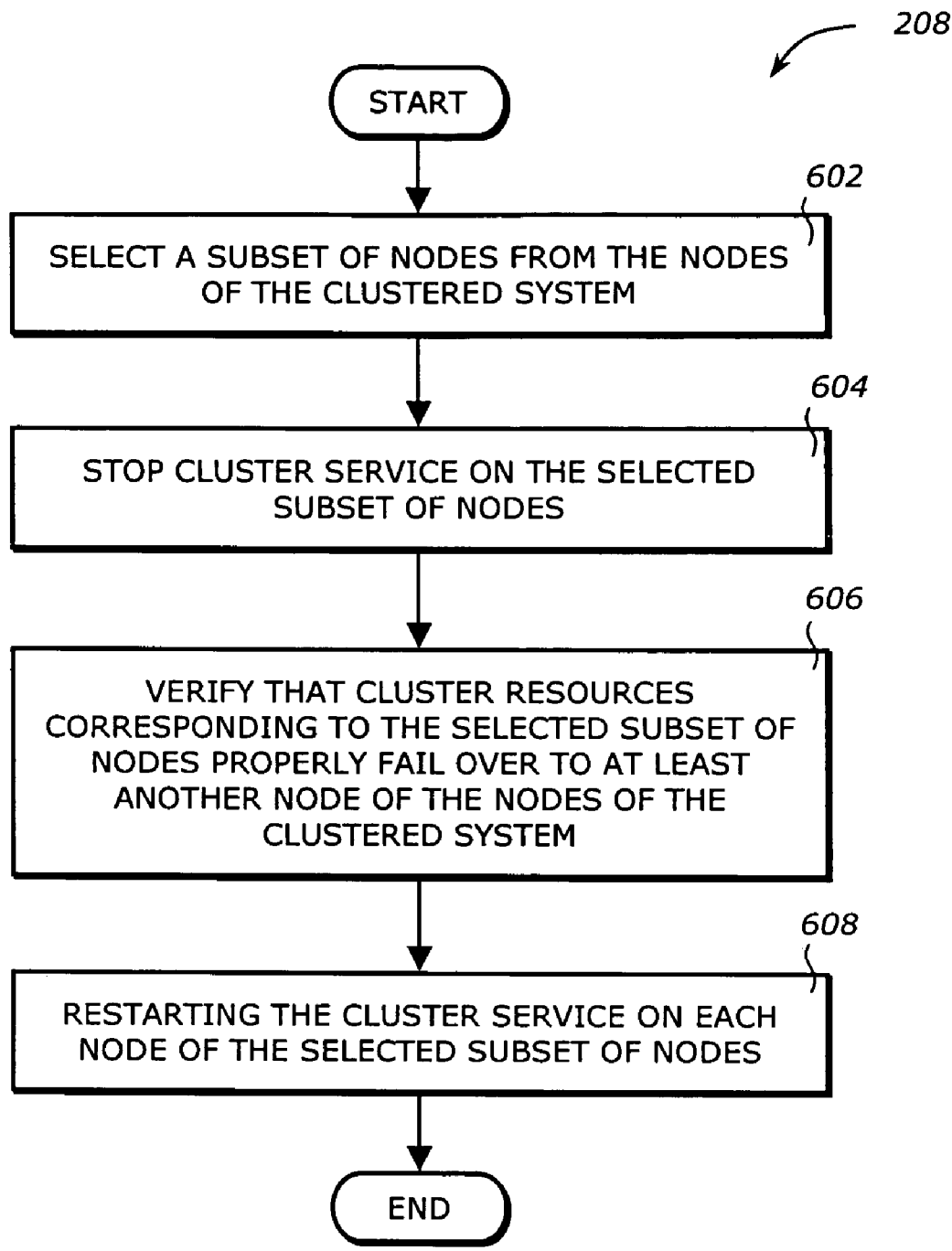
FIG. 6 is a flowchart illustrating an embodiment of block 208 of process 200 shown in FIG. 2.

FIG. 6 is a flowchart illustrating an embodiment of block 208 of process 200 shown in FIG. 2. Upon Start, process 208 selects a set of nodes from the nodes of the clustered system (block 602). Each of the nodes in the set of nodes controls corresponding cluster resources. Process 208 stops cluster service on the selected set of nodes (block 604). Process 208 verifies that the corresponding to the selected subset of nodes properly fail over to one or more nodes of the nodes of the clustered system (block 606). Process 208 restarts the cluster service on each node of the selected subset of nodes (608). Process 208 then terminates.

In one implementation, the Move test and Stop test are incorporated into one test module. The move and stop functions are separated in time by the TEST_TIMEOUT period. Initially, the test module randomly chooses a timeout period between 1 and 540 seconds for each of the tests (move or stop). The first timeout to expire determines the first test to execute since only one test may be executed at any given time. If both test delays expire on the same second, the Stop test will be run first and then the Move test. If the delay on a non-running test expires, this test will remain idle until the currently running test completes, at such time the idling test will start running.

The Move test initially moves all the resources to all the nodes in the cluster to ensure that all resources and nodes are on-line. The Move test randomly selects a node from the cluster. Then the Move test randomly selects a set of resources from a list of available resources to move to the selected node. The selected resources correspond to cluster groups from one or more nodes. Once the move operation has been completed, the Move test will ensure that the resources have remained online on the selected node. If one or more resources fail or the resources fail to move to the selected node, an error will be generated and the entire Move test will fail. If the Move test completes successfully, then the test timeout value is reset to a new value between 1 and 540 seconds.

The Stop test is designed to stop the cluster service on selected one or more nodes, ensure that all the resources controlled by the selected node or nodes fail over to any existing node or nodes in the cluster, and restarts the cluster service on the selected nodes. The Stop test randomly selects nodes to form a set of nodes on which the stop and start of the cluster service will be performed. The set of nodes may have from 1 to N−1 nodes in an N-node cluster. After the Stop test has initiated a stop on the cluster service, if the cluster service does not stop successfully within a time threshold (set at 3 minutes), the Stop test declares a failure. Similarly, after the Stop test has initiated a start on the cluster service, if the cluster service does not start successfully within the threshold, the Stop test declares a failure. If the stopping/starting process exceeds this time threshold, an error will be generated and the entire Stop test will fail. If this Stop test completes successfully then the test timeout is reset to a value between 1 and 540 seconds.

When the Stop/Move test reaches its timeout value, the Stop/Move test stops and user is notified that the cluster has successfully passed the test. In one implementation, this notification is indicated by displaying a check mark in the checkbox beside the Stop/Move test selection on the main menu of the user interface. A log is created for the test iteration.

Blue Screen of Death Test

Figure 7:
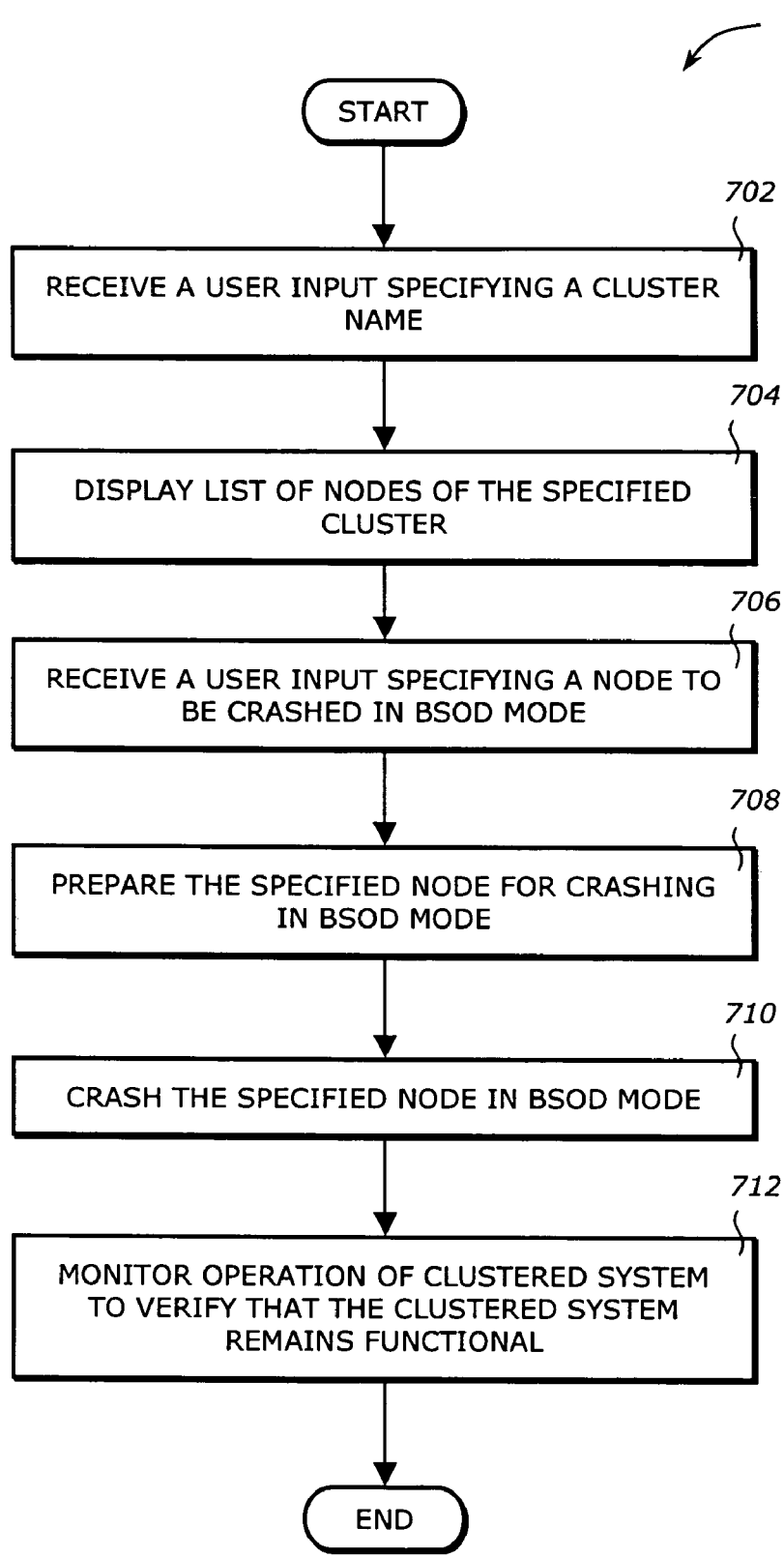
FIG. 7 is a flowchart illustrating an embodiment of block 210 of process 200 shown in FIG. 2.

FIG. 7 is a flowchart illustrating an embodiment of block 210 of process 200 shown in FIG. 2. Upon Start, process 210 receives a user input specifying a cluster name (block 702). Process 210 displays the list of nodes in the specified cluster to the user (block 704). Next, process 210 receives a user input specifying a node to be crashed in the BSOD mode, the node being selected from the list of nodes (block 706). Process 210 prepares the selected node for crashing in the BSOD mode by copying crash files to the specified node and registering the crash files as a service (block 708). Process 210 crashes the selected node in the BSOD mode (block 710), then monitors the operation of the clustered system to verify that the clustered system remains functional (block 712). Process 210 then terminates.

The acronym BSOD (Blue Screen Of Death) in the Windows environment refers to the characteristic bug check dump screen in Windows that provides the exception description, bug check code, and relevant stack and register values.

The BSOD test is used to test reservation release on the node that is crashed in the BSOD mode. When a cluster name is specified by a user, a list of the nodes in the specified cluster will be displayed to the user. From this list, the user can select a node to be crashed in the BSOD mode. After the user presses the crash button, the BSOD test prepares the selected node for crashing in the BSOD mode by copying a set of files called crash files to the specified node and registering the crash files as a service. Then the BSOD test crashes in the BSOD mode the registered service that is running on the selected node, then monitors the operation of the clustered system to verify that the clustered system remains functional.

If the cluster is still online and the BSOD command was issued correctly to the selected node then a pass status will be returned. If the cluster fails to remain online, or if the BSOD command is not issued correctly, the BSOD test will fail and will indicate which error caused the failure.

A clean-up routine is left on the selected node prior to the crash, so that, when the node comes back online, the service and crash files copied to the node prior to the crash will be cleaned up.

The BSOD test also provides testing of SCSI reserve/release in a clustered environment. If the BSOD is issued on the node that owns the quorum resource and this node does not properly give up reservation of the quorum resource then the cluster will fail.

Ensuring that a system is capable of passing this BSOD test eliminates some of the most common reasons that cluster systems fail in the Validate N Node phase and Hardware phase (SCSI reserve/release test) of the Cluster HCT certification test run.

Note that, currently, the Cluster HCT does not include any test that is similar to the BSOD test.

Stress Tests

Figure 8:
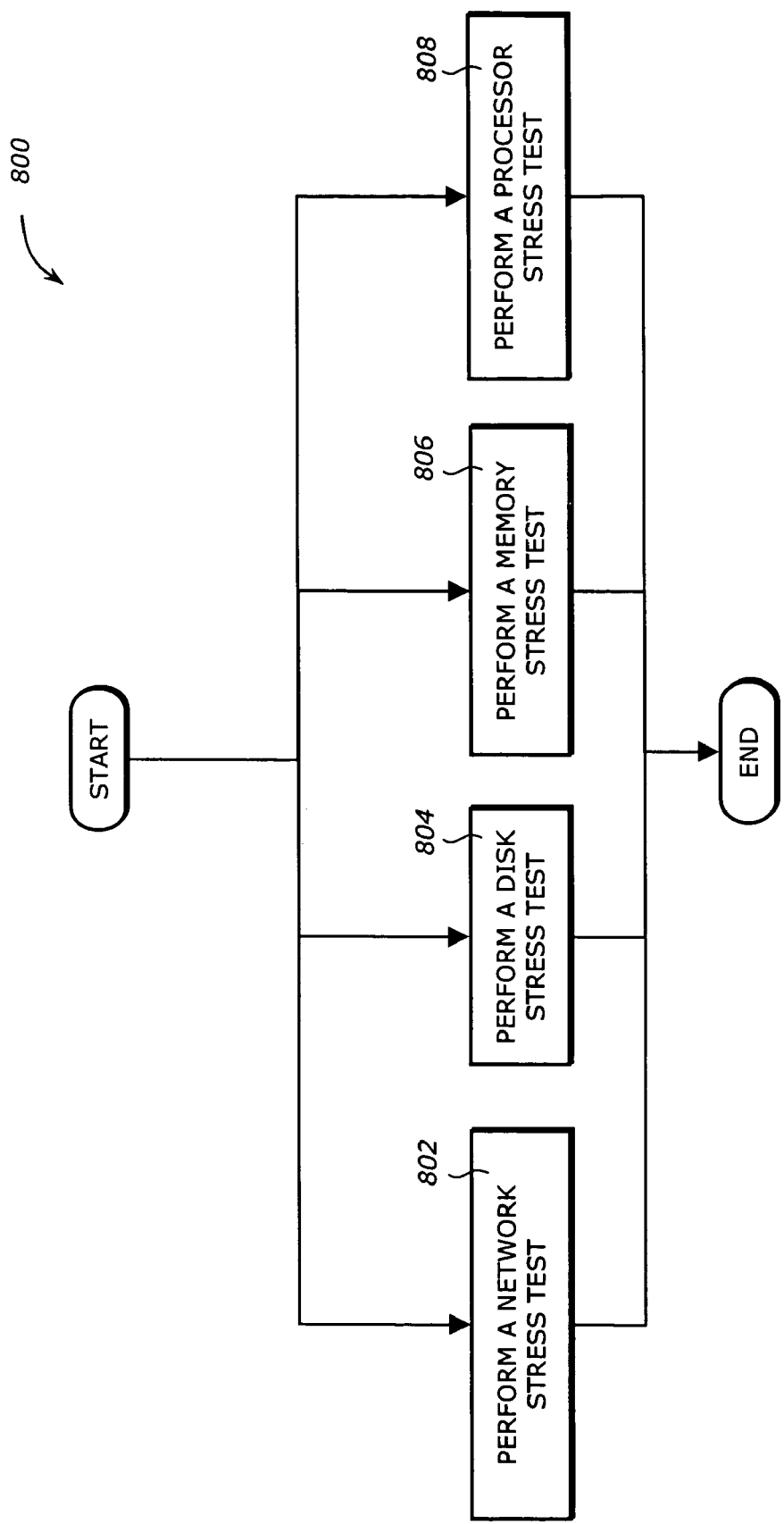
FIG. 8 illustrates the additional tests that may be performed in addition to the tests of process 200 shown in FIG. 2.

FIG. 8 illustrates the additional tests that may be performed in addition to the tests of process 200 shown in FIG. 2. In one embodiment of the present invention, a user may specify one or more of these additional tests to be executed. These additional tests comprise a network stress test (block 802), a disk stress test (block 804), a memory stress test (block 806), and a processor stress test (block 808).

Network Stress Test

The network stress test is used to stress network bandwidth on the network adapters of the cluster under test.

When a network failure is encountered during a Cluster HCT Test Certification run, the network failure can cause major problems that generally result in the cluster failing the Cluster HCT. Thus, while not directly tested by the Cluster HCT, the integrity and functionality of the network paths under very heavy load are necessary to have in order to pass any attempted Cluster HCT.

The network stress test provides a very high network load to identify any weakness or problems that could be obstacles. The user may specify the size of a test file to be generated. The test file can be anywhere from 1 megabyte to 4 gigabytes in size. Network traffic is generated when the test file is used to perform a series of file copy and verify operations. The copy function is tailored to send data packets in 31-kilobyte (KB) chunks, which further increases the network bandwidth usage during the file copy operations.

The network stress test is launched when a client connects to the host (i.e., the cluster under test). The network stress test application copies files to the clients which in turn generate files to exercise the network adaptors on the host. The clients are separated by subnet. Packets are sent in 31 KB chunks. Client files are verified against the master file. Test file is generated on the clients.

Disk Stress Test

The disk stress test is used to maximize disk activity on the local disk drives of the cluster under test.

The disk stress test generates a series of files with file size ranging from 1 megabyte (MB) to 1 gigabyte (GB), then replicate these files a multiple of times. Each copy of a file will be verified against the original file to ensure that no errors were introduced during the copy process. This test will run for any amount of time specified by the user. The files are created on a shared disk. The disk stress test creates files successively. The file size of a created file is two times the size of an immediately preceding file. The file size ranges from 1 MB to 1 GB. The disk stress test verifies the file data and creation.

The disk stress test is registered as a generic application in the cluster. The test runs on the cluster. The test creates a log file and outputs the status of the test.

Memory Stress Test

The memory stress test allocates a given amount of memory. The test then tests this memory by writing different patterns into the memory, and verifying later that this pattern is still in memory. In one embodiment, the memory stress test will allocate 100 MB of both real and virtual memory by default. A user can change this allocation value by using a command line argument. The command line argument can be a value from 1 to 16, 16 being the limit due to the 4 GB tunneling model limitation on 32-bit applications. This test also uses minimal processing power to execute its task. Running numerous copies of this test is also possible in the event the user wishes to test all of the memory in a system that has more than 1.6 GB of physical memory.

The following describes one embodiment of the memory stress test. First, the memory stress test writes the data pattern 55 through the memory region, then goes back through this region to make sure that the data patterns are still 55's. Then, the memory stress test fills AA throughout the memory, followed by a verify process. This process is repeated for FF's, 00's, A5's, and finally 5A's. These memory patterns were chosen because they change the memory bit ordering on each of the well-known extremes. An example of a memory region would be as follows:

55—01010101
    AA—10101010
    FF—11111111
    00—00000000
    A5—10100101
    5A—01011010

Once the full routine of filling and verifying the above 6 patterns has been completed successfully, the entire process will repeat. An indicator at the top of the utility window on the user interface will display the number of iterations that have been processed.

If a verify error occurs then a pop-up on the user interface will be generated that will show the memory region that encountered the error, and the memory stress test will then exit.

The memory stress test runs on the test host and registered as a generic application in the cluster. This test consumes very low amounts of CPU time.

Processor Stress Test

The processor stress test is used to simulate a real customer environment where more resources can be added to the cluster. The test is designed to automatically populate resources on an existing cluster when the test starts. The processor stress test is a service that is generated on each node within the cluster, but the service only starts on the node that currently owns all the resources. When the service starts on the node, it will execute a prime number generator in the background, exercising a minimal amount of processor utilization on that node.

The processor stress test is registered as a generic service in the cluster. It uses CPU time by generating prime numbers. Prime number generation is between 1 and 2 billion. The processor stress test runs on the test host. It displays the running progress to the user.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine-readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for testing core functionality of a clustered system having a plurality of nodes, the method comprising the operations of:
   (a) performing a cluster population test including populating the clustered system with cluster-aware applications;
   (b) performing a crash and reboot test to stress core operations running within the clustered system including executing a series of crashes or reboots on a subset of the nodes;
   (c) performing a move test including moving resources to a selected node of the clustered system and verifying that the resources remain on-line at the selected node;
   (d) performing a stop test including stopping cluster service on a selected subset of nodes of the clustered system within a timeout threshold and restarting the cluster service on the selected subset of nodes; and
   (e) performing a Blue Screen Of Death (BSOD) test including crashing in BSOD mode one of the nodes of the clustered system and testing reservation release on the crashed node.

2. The method of claim 1 further comprising at least one of the following operations:
   performing a network stress test including generating and increasing network traffic;
   performing a disk stress test including maximizing activity on local disk drives of one of the nodes;
   performing a memory stress test; and
   performing a processor stress test.

3. The method of claim 1 wherein operation (a) comprises:
   creating a plurality of generic applications and generic services in existing disk groups of the clustered system;
   creating a set of empty cluster groups;
   creating the generic applications and generic services inside the empty cluster groups; and
   starting the generic applications and generic services on one of the nodes that currently owns the created cluster groups.

4. The method of claim 1 wherein operation (b) comprises:
   (1) randomly selecting the subset of nodes; and
   (2) performing one of the following:
      crashing in power failure simulation mode the selected subset of nodes, so that cluster resources on the selected subset of nodes are failed over to one or more nodes not included in the selected subset; and
      rebooting the selected subset of nodes, so that cluster resources on the selected subset of nodes are failed over to one or more nodes not included in the selected subset.

5. The method of claim 1 wherein operation (c) comprises:
   (1) selecting a node from the nodes in the clustered system;
   (2) selecting a set of resources from a list of resources;
   (3) moving the selected set of resources to the selected node; and
   (4) verifying that the selected set of resources remains on-line at the selected node.

6. The method of claim 1 wherein operation (d) comprises:
   (1) selecting a subset of nodes from the nodes of the clustered system, each of the nodes in the subset of nodes controlling corresponding cluster resources;
   (2) stopping cluster service on the selected subset of nodes;
   (3) verifying that cluster resources corresponding to the selected subset of nodes properly fail over to one or more nodes of the nodes of the clustered system; and
   (4) restarting the cluster service on each node of the selected subset of nodes.

7. The method of claim 1 wherein operation (e) comprises:
   receiving a user input specifying a node to be crashed in BSOD mode, the specified node being one of the nodes of the clustered system;
   preparing the specified node for crashing in BSOD mode by copying crash files to the specified node and by registering the crash files as a service;
   crashing in BSOD mode the specified node; and
   monitoring operation of the clustered system to verify that the clustered system remains functional.

8. An article of manufacture comprising:
   a machine-accessible storage medium including data that, when accessed by a machine, causes the machine to perform operations comprising:
   (a) performing a cluster population test including populating the clustered system with cluster-aware applications;
   (b) performing a crash and reboot test to stress core operations running within the clustered system including executing a series of crashes or reboots on a subset of the nodes;
   (c) performing a move test including moving resources to a selected node of the clustered system and verifying that the resources remain on-line at the selected node;
   (d) performing a stop test including stopping cluster service on a selected subset of nodes of the clustered system within a timeout threshold and restarting the cluster service on the selected subset of nodes; and
   (e) performing a Blue Screen Of Death (BSOD) test including crashing in BSOD mode one of the nodes of the clustered system and testing reservation release on the crashed node.

9. The article of manufacture of claim 8 wherein the machine-accessible medium further comprises data that, when accessed by the machine, cause the machine to perform operations comprising:
   performing a network stress test including generating and increasing network traffic;
   performing a disk stress test including maximizing activity on local disk drives of one of the nodes;
   performing a memory stress test; and
   performing a processor stress test.

10. The article of manufacture of claim 8 wherein the data causing the machine to perform the operation of performing a cluster population test comprise data that, when accessed by the machine, cause the machine to perform operations comprising:
    creating a plurality of generic applications and generic services in existing disk groups of the clustered system;
    creating a set of empty cluster groups;
    creating the generic applications and generic services inside the empty cluster groups; and
    starting the generic applications and generic services on one of the nodes that currently owns the created cluster groups.

11. The article of manufacture of claim 8 wherein the data causing the machine to perform the operation of performing a crash and reboot test comprise data that, when accessed by the machine, cause the machine to perform operations comprising:
 (1) randomly selecting the subset of nodes; and
 (2) performing one of the following:
  crashing in power failure simulation mode the selected subset of nodes, so that cluster resources on the selected subset of nodes are failed over to one or more nodes not included in the selected subset; and
  rebooting the selected subset of nodes, so that cluster resources on the selected subset of nodes are failed over to one or more nodes not included in the selected subset.

12. The article of manufacture of claim 8 wherein the data causing the machine to perform the operation of performing a move test comprise data that, when accessed by the machine, cause the machine to perform operations comprising:
 (1) selecting a node from the nodes in the clustered system;
 (2) selecting a set of resources from a list of resources;
 (3) moving the selected set of resources to the selected node; and
 (4) verifying that the selected set of resources remains on-line at the selected node.

13. The article of manufacture of claim 8 wherein the data causing the machine to perform the operation of performing a stop test further comprise data that, when accessed by the machine, cause the machine to perform operations comprising:
 (1) selecting a subset of nodes from the nodes of the clustered system, each of the nodes in the subset of nodes controlling corresponding cluster resources;
 (2) stopping cluster service on the selected subset of nodes;
 (3) verifying that cluster resources corresponding to the selected subset of nodes properly fail over to one or more nodes of the nodes of the clustered system; and
 (4) restarting the cluster service on each node of the selected subset of nodes.

14. The article of manufacture of claim 8 wherein the data causing the machine to perform the operation of performing a Blue Screen of Death test comprise data that, when accessed by the machine, cause the machine to perform operations comprising:
 receiving a user input specifying a node to be crashed in BSOD mode, the specified node being one of the nodes of the clustered system;
 preparing the specified node for crashing in BSOD mode by copying crash files to the specified node and by registering the crash files as a service;
 crashing in BSOD mode the specified node; and
 monitoring operation of the clustered system to verify that the clustered system remains functional.

15. A system comprising:
 a processor; and
 a memory coupled to the processor, the memory containing instructions that, when executed by the processor, cause the processor to:
(a) perform a cluster population test including populating the clustered system with cluster-aware applications;
(b) perform a crash and reboot test to stress core operations running within the clustered system including executing a series of crashes or reboots on a subset of the nodes;
(c) perform a move test including moving resources to a selected node of the clustered system and verifying that the resources remain on-line at the selected node;
(d) perform a stop test including stopping cluster service on a selected subset of nodes of the clustered system within a timeout threshold and restarting the cluster service on the selected subset of nodes; and
(e) perform a Blue Screen Of Death (BSOD) test including crashing in BSOD mode one of the nodes of the clustered system and testing reservation release on the crashed node.

16. The system of claim 15 wherein the instructions further comprise instructions that, when executed by the processor, cause the processor to:
 perform a network stress test including generating and increasing network traffic;
 perform a disk stress test including maximizing activity on local disk drives of one of the nodes;
 perform a memory stress test; and
 perform a processor stress test.

17. The system of claim 15 wherein the instructions causing the processor to perform the operation of performing a cluster population test comprise instructions that, when executed by the processor, cause the processor to:
 create a plurality of generic applications and generic services in existing disk groups of the clustered system;
 create a set of empty cluster groups;
 create the generic applications and generic services inside the empty cluster groups; and
 start the generic applications and generic services on one of the nodes that currently owns the created cluster groups.

18. The system of claim 15 wherein the instructions causing the processor to perform the operation of performing a crash and reboot test comprise instructions that, when executed by the processor, cause the processor to:
 (1) randomly select the subset of nodes; and
 (2) perform one of the following:
  crashing in power failure simulation mode the selected subset of nodes, so that cluster resources on the selected subset of nodes are failed over to one or more nodes not included in the selected subset; and
  rebooting the selected subset of nodes, so that cluster resources on the selected subset of nodes are failed over to one or more nodes not included in the selected subset.

19. The system of claim 15 wherein the instructions causing the processor to perform the operation of performing a move test comprise instructions that, when executed by the processor, cause the processor to:
 (1) select a node from the nodes in the clustered system;
 (2) select a set of resources from a list of resources;
 (3) move the selected set of resources to the selected node; and
 (4) verify that the selected set of resources remains on-line at the selected node.

20. The system of claim 15 wherein the instructions causing the processor to perform the operation of performing a stop test further comprise instructions that, when executed by the processor, cause the processor to:
 (1) select a subset of nodes from the nodes of the clustered system, each of the nodes in the subset of nodes controlling corresponding cluster resources;
 (2) stop cluster service on the selected subset of nodes;
 (3) verify that cluster resources corresponding to the selected subset of nodes properly fail over to one or more nodes of the nodes of the clustered system; and
 (4) restart the cluster service on each node of the selected subset of nodes.

21. The system of claim 15 wherein the instructions causing the processor to perform the operation of performing a Blue Screen of Death test comprise instructions that, when executed by the processor, cause the processor to:

receive a user input specifying a node to be crashed in BSOD mode, the specified node being one of the nodes of the clustered system;

prepare the specified node for crashing in BSOD mode by copying crash files to the specified node and by registering the crash files as a service;

crash in BSOD mode the specified node; and monitor operation of the clustered system to verify that the clustered system remains functional.

* * * * *